United States Patent [19]
Blonder et al.

[11] Patent Number: 6,098,085
[45] Date of Patent: Aug. 1, 2000

[54] WORD-SERIAL READER FOR NETWORK DEVICES HAVING LIMITED DISPLAY CAPABILITIES

[75] Inventors: Greg E. Blonder, Summit; David M. Weimer, Aberdeen; Pierre David Wellner, Middletown, all of N.J.

[73] Assignee: AT&T Corp., New York, N.Y.

[21] Appl. No.: 08/819,480

[22] Filed: Mar. 17, 1997

[51] Int. Cl.⁷ .................................................. G06F 17/21
[52] U.S. Cl. ............................................ 707/531; 707/513
[58] Field of Search .................................. 707/500, 501, 707/513, 530, 531; 455/38.4; 340/825.44

[56] References Cited

U.S. PATENT DOCUMENTS

| | | | |
|---|---|---|---|
| 4,660,032 | 4/1987 | Tsunoda | 340/825.44 |
| 5,147,205 | 9/1992 | Gross | 434/169 |
| 5,210,789 | 5/1993 | Jeffus et al. | 379/127 |
| 5,526,259 | 6/1996 | Kaji | 704/3 |
| 5,739,809 | 4/1998 | McLaughlin et al. | 345/150 |
| 5,774,109 | 6/1998 | Winsky et al. | 345/124 |
| 5,822,720 | 10/1998 | Bookman et al. | 704/3 |
| 5,850,211 | 12/1998 | Tognazzini | 345/158 |

OTHER PUBLICATIONS

Tenax Software Engineering, Vortex 3.0, The Power Reading Tool, 1996, 42 pages.

*Primary Examiner*—Joseph H. Feild
*Attorney, Agent, or Firm*—Kenyon & Kenyon

[57] ABSTRACT

A method and apparatus for presenting information using an electronic display. Information stored in a source format is retrieved from a source device. The information is converted the source format to a uniform serial stream format. The converted information is presented on the display by sequentially flashing words on the display while presenting static elements to help a user navigate through the information.

6 Claims, 12 Drawing Sheets

FIG. 8C

628 — survey / menu
Your age group:
18-29

630 — survey / menu
Your age group:
30-40

632 — survey / check
What AT&T services do you use?
☐ Long distance

634 — survey / check
What AT&T services do you use?
☒ WorldNet

636 — survey / check
What AT&T services do you use?
☒ Universal Card

638 — survey / button
Thank you for your answers:
Submit Answers

640 — survey / button
What AT&T services do you use?
Cancel

642 — survey / button
What AT&T services do you use?
Start Over

WORD-SERIAL READER FOR NETWORK DEVICES HAVING LIMITED DISPLAY CAPABILITIES

BACKGROUND OF THE INVENTION

The invention refers generally to presenting information on displays. More particularly, the invention relates to an apparatus and method for presenting information on a computer or electronic display ("computer display") over a network using a word-serial stream that flashes one word on the computer display at a time, along with static structural elements for the information to give the reader contextual information.

There are many different ways of presenting information on a computer display such as those found on a desktop or laptop computer. Conventional methods typically present text information contained within a document in a format consisting of characters forming words, words forming lines, lines forming paragraphs, and paragraphs forming pages (hereinafter referred to as "page format"). The words of a line are typically separated by punctuation such as periods, commas, semi-colons, hyphens, and so on. A reader is led to reading a page of information according to cultural conventions. For example, in the United States the convention is to read a horizontal line of text from left to right across the page, continuing from top to bottom to the next horizontal line of text until the reader reaches the last line of the page. In Asian cultures, the convention is to read vertical lines of text from top to bottom, and continue left across the page to the next vertical line of text until the reader reaches the last line of the page to the left.

The evolution of personal computers created a whole new mechanism for presenting information to a user. The development of high resolution monitors, increased processing speed and memory, and advanced sound boards permitted computers to present information in a multi-media format. Yet despite this evolution, many software designers continue to use the same page format used by more traditional media such as newspapers and magazines, to present information for a user. For example, the Internet and World Wide Web (WWW) present information to a user in a modified page format, referred to as a ""webpage"". The "webpage" follows the page format, but contains hypertext links embedded throughout the page which a user can select to move to another portion of the "webpage", move to another "webpage", display a graphic, run an animation sequence, listen to sounds, and so forth.

The use of the page format on computer displays, however, is unsatisfactory in many ways. For one, text information available to the reader is limited by the size of the display. This poses various problems, especially for devices having small displays such as pagers, cellular phones, personal information managers and organizers, fax notebooks, pen computers, palmtops, and the like.

Current generations of such small display devices solve this problem by enlarging the display to accommodate several lines of text. Due to problems of power, economics and ergonomics, it becomes impractical for such device manufacturers to significantly increase display sizes. Thus, a user is left with a very cumbersome means of viewing information, such as scrolling information in blocks of two or three lines. This method is not only inefficient in terms of a user's reading speed, but also an inconvenience to the user due to the amount and types of manipulations required to scroll through the information.

Another problem with the use of the page format on computer displays is that even when the size of the display is reasonably large, such as on a desktop monitor, normal page formatting consumes a relatively large portion of the available viewing area on the screen. For example, with a typical electronic mail reader, a substantial portion of the available computer display is allocated for viewing a document. If a user wants to engage in multi-tasking operations, the user must either re-size the viewing area, in the case of a computer system using a graphics user interface (GUI), or use only one application at a time. Both solutions are inefficient, in that the former increases the difficulty in reading the document, and the latter increases the time necessary for accessing an application to read a document.

An alternative to the page format is the word-serial format, which was originally developed to help readers with narrow visual fields. The word-serial format is a well-known technique of flashing a single word at a time in front of a user. This technique mimics speech in that a listener only hears one word at a time.

The use of the word-serial format on a computer display solves many problems associated with the page format. Since the word-serial format flashes only a single word at a time, a user is capable of reading text information on very small displays such as those found on pagers. Further, the word-serial format improves reading and comprehension rates. When a reader scans a normal page of text, the motion naturally tends to be irregular. This slows down the actual rate at which people are capable of reading with comprehension. By way of contrast, the word-serial format minimizes eye movement thereby increasing reading speed. For example, the word-serial technique can improve an untrained reader's reading rate by a factor of two. Anecdotal evidence suggests that some trained readers have increased their reading rates by one to two orders of magnitude. In addition, since the word-serial format forces the reader to concentrate, the reader's information comprehension rate typically improves as well.

Computer programs for using the word-serial format to display text on a computer display are currently available. These programs are designed to run on a stand-alone computer, such as a personal computer (PC), and are capable of flashing words on a screen at rates of 1500 to 2000 words per minute. Examples of these programs include Vortex, TachyReader, and Rocket Reader.

FIG. 1 is a picture of a computer display used by a representative word-serial format computer program referred to as Vortex. As shown in FIG. 1, Vortex provides a load button 10 for loading a text document into the Vortex reader. A run button 12 initiates Vortex to begin displaying the text document on display 32 by flashing a single word at a time. A stop button 14 stops execution of the Vortex reader, and the back button 16 allows a user to scroll backward through the text document. Font button 18 permits the user to change fonts and font size using scroll bar 20. Buttons 22 and 24 permit the user to select whether the flashed word is displayed on the left hand side of display 32 or centered on display 32, respectively. Scroll bar 28 controls how many words per minute Vortex flashes for the reader, and displays the current words per minute using display 26. Close button 30 exits the program.

Current versions of computer programs capable of presenting text information in word-serial format such as Vortex, however, are unsatisfactory in many ways. For example, conventional programs do not provide any static elements to give a reader contextual information, such as headers and topics. As can be seen from FIG. 1, the only information presented to the reader concerning the content of a document is a single word within the document. The user has no context to help guide the reader in understanding the flashing words, or to quickly move to other portions of the document. Conventional programs are also designed to work with stand alone computers, and are not designed to work in a network environment such as the Internet and World Wide Web (WWW). Moreover, conventional programs are not equipped to handle multi-media information such as animation, images, sounds, figures, and so forth. As can be seen by FIG. 1, Vortex is not designed to present multi-media information associated with a document. Thus, a user would not be capable of browsing a "webpage" using Vortex since there are no accommodations for hyperlinks, images, forms or animation. Further, conventional programs are not designed to follow standard rules of grammar and punctuation, such as pauses after commas, periods or paragraphs. For example, Vortex does not vary the rhythm of the flashing words according to standard punctuation such as periods and commas. Finally, conventional programs such as Vortex are not equipped to display documents stored in a non-uniform format.

A substantial need, therefore, exists for a method and apparatus for presenting information on a computer display over a network which solves the aforementioned problems.

SUMMARY OF THE INVENTION

These and other needs are met by the invention described herein. One embodiment of the invention includes a method and apparatus for presenting information using an electronic display. Information stored in a source format is retrieved from a source device. The information is converted from the source format to a uniform serial stream format. The converted information is presented on the display by sequentially flashing words on the display while presenting static elements to help a user navigate through the information.

With these and other objects, advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 8(C) is a second illustration of how HTML form information is presented on a pager display in accordance with one embodiment of the invention.

DETAILED DESCRIPTION

The invention relates to an apparatus and method for presenting information on a computer display using a word-serial stream that flashes one word on the computer display at a time. One embodiment of the invention includes a word-serial reader that provides static structural elements for the information to give the reader contextual information and rapid navigation through the document. The word-serial reader also permits a reader to have access to information presented in multi-media format including text, animation, graphics, images, figures, sounds or hyperlinks. In addition, the word-serial reader includes an interface for converting existing document file structures into a standard format readable by the word-serial reader. Consequently, the word-serial reader can be implemented as a browser for reading documents transmitted over a network such as the Internet and WWW.

The word-serial reader can be used to display information from a variety of sources and in multiple formats. For example, the word-serial reader can read files stored locally such as on a personal computer (PC), or on a network device such as a server. Further, the format of the files could range from text files, electronic mail files, and files written in Hypertext Markup Language (HTML) used in the WWW.

Figure 1:
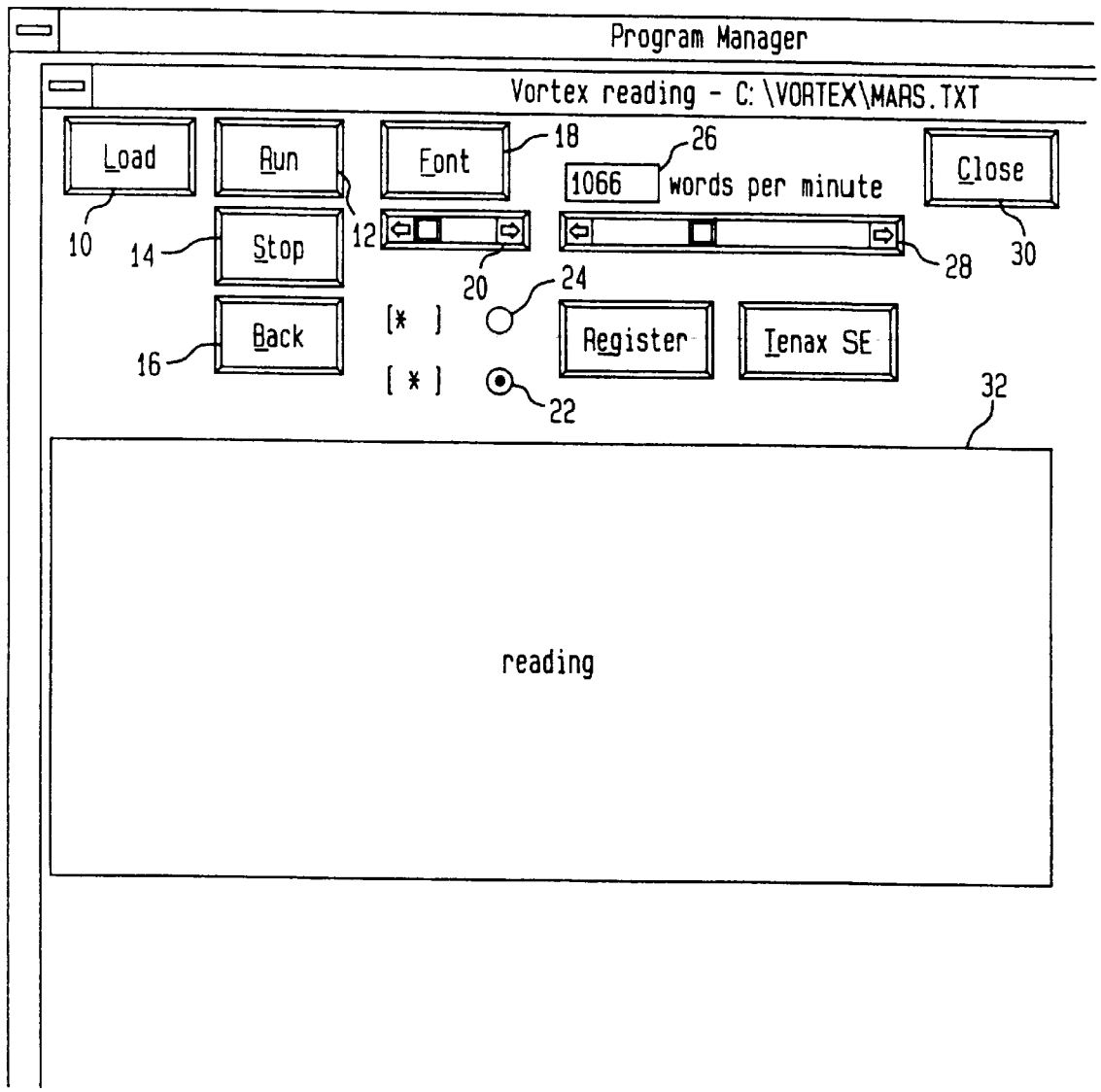
FIG. 1 is a picture of a computer display used by a representative word-serial format computer program referred to as Vortex.
Figure 2:
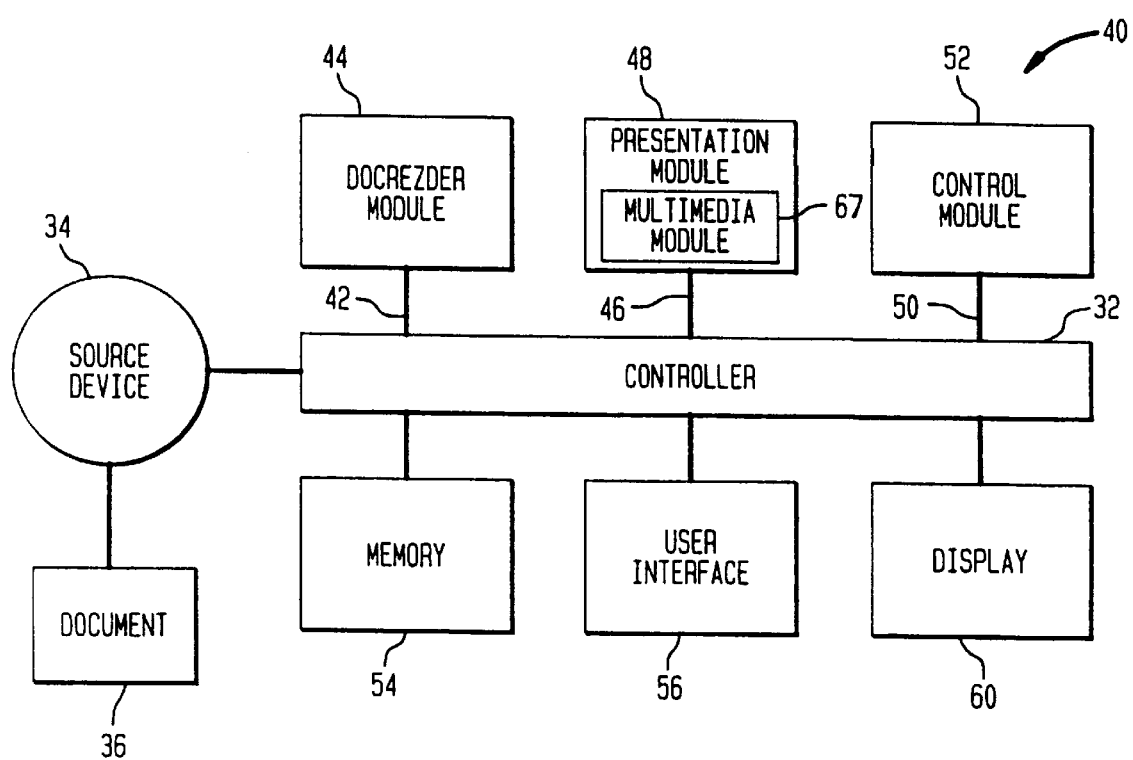
FIG. 2 is a block diagram of a word-serial reader in accordance with one embodiment of the invention.

Referring now in detail to the drawings wherein like parts are designated by like reference numerals throughout, there is illustrated in FIG. 2 a block diagram of a word-serial reader in accordance with one embodiment of the invention. This embodiment of the invention uses a HTML file as an example of the type of information the word-serial reader is capable of displaying. It can be appreciated by a person of ordinary skill in the art, however, that files stored in other formats, such as electronic mail, fall within the scope of the invention as well.

As shown in FIG. 2, this embodiment of the invention includes a word-serial reader 40 for presenting information on an electronic display 60, wherein the information is stored on a source device 34 in a source document 36. In this embodiment, source device 34 is located on a network such as the Internet, and source document 36 is an HTML document used by the WWW. Word-serial reader 40 comprises a docreader module 44 connected to a controller 32 by input/output (I/O) line 42, a presentation module 48 connected to controller 32 by I/O line 46, and a control module 52 connected to controller 32 by I/O line 50. Further, word serial reader 40 further comprises a memory 54, a user-interface 56 and a computer display 60, all of which are connected to controller 32.

In operation, docreader module 44 receives the information from document 36 through I/O line 42. Docreader module 44 converts the format of HTML document 36 to a serial stream format used by word-serial reader 40. In general, docreader module 44 opens a Universal Resource Locator (URL) address where HTML document 36 is located. Docreader module 44 reads HTML document 36 line by line, parses HTML document 36 into control codes, static elements, and individual words or lines, and loads the parsed information from HTML document into dual word buffers stored in memory 54.

It is worthy to note that in this embodiment of the invention, docreader module 44 is network resident, and the load/parse/format steps are executed in the network server process, and presentation module 48 and control module 52 execute the load/parse/display steps at the client site. This configuration permits more complex algorithms for recognizing structure and format conversion to the be applied. The network resident program can manage a known archive of documents, mailboxes, etc., or it can act as a proxy, that processes information from anywhere on the network. The client resident and server resident processes are both under real-time control, that can be applied to navigation, structuring methods, temporal effects, and display methods. It can be appreciated, however, that any portion of the processing labeled "network resident" can be implemented in the client, if the client has sufficient memory and processing speed. Similarly, any processing labeled "client resident" can be implemented in the network.

Thus, docreader module 44 parses many different formats for a source document, extracts the structure from the source document, and reformats the document to a standard serial format that works across all applications in the network resident processing steps. This standard structure is then loaded, parsed and displayed at the client site.

The user has real-time control over the reading of documents. This real-time control can be in the form of user input, data driven, or driven by network events (e.g., new mail). With respect to the network resident portions of word-serial reader 40, navigation may effect load, and can alter the parsing and formatting algorithm. The structuring used for the source document can effect the parsing and formatting algorithm as well. On the client side, navigation may effect loading and parsing, and structuring may change the effects of parsing.

The word-serial reader also has a presentation module 48 having a presentation module I/O line 46 for receiving the parsed information. Presentation module 48 sequentially flashes the parsed information on display 60 while presenting static information to help a user navigate through HTML document 36. It also displays static information along with the word-serial display (also referred to as "streaming") . The term static information, as used herein, refers to information which is displayed in a non-streaming mode. Display methods can be determined by a particular task, data-type or real-time control.

More particularly, presentation module 48 receives the parsed information from docreader module 44 and stored in one of dual buffers from I/O line 46. Once the first buffer is full, the first buffer is readlocked while the words are flashed on display 60, and the static elements such as titles and headers are provided according to the specific context of the words being flashed. In other words, the title and headings for each section are displayed while the words of the section are flashed one at a time on display 60 (a more detailed description of these static elements will be discussed with reference to FIG. 7). As the first buffer is being used by presentation module 48, docreader module 44 is filling a second buffer. Thus, flashing module 48 and docreader module 44 alternate between using the first and second buffers to improve the conversion speed of word-serial reader 40.

In addition, presentation module 48 varies the rhythm and timing of the flashing words from HTML document 36 to approximate the punctuation used in HTML document 36, which is normally displayed in page format in conventional systems. For example, when presentation module 48 reads a "<P>" command from HTML document 36, which indicates the beginning of a paragraph, presentation module 48 inserts a short delay into the flashing sequence to give the reader a pause or break in reading, similar to that which is intended for a document displayed in page format. Similarly, punctuation such as a "." and a "," are given short delays to approximate breaks in or between sentences, as also found in documents displayed in page format.

Word-serial reader 40 has control module 52 and a control module I/O line 50 for monitoring and controlling the parsed information presented on display 60. More particularly, control module 52 monitors a user interface 56 for commands affecting the presentation of information by presentation module 48 on display 60. For example, a user could control the speed of the words flashing on the screen, the position of the word as it flashes (e.g., left, right or middle of the display), change fonts or font size, pause the stream of information, select a hypertext link, and so forth (a full description of possible features will be discussed with reference to FIGS. 3, 8 and 9, discussed later). Moreover, these commands can be implemented in real-time. User interface 56 includes standard computer interfacing technology, such as a keyboard, mouse, touch screen, light pen, track ball, pager controls and so forth.

The information from HTML document 36 can be presented on an electronic or computer display in a number of ways, depending on the size of the display, user preferences, network events, client events, and so forth. Table 1 shown below summarizes some of the display modes which can be used by word-serial reader 40.

TABLE 1

| MODE | DESCRIPTION |
| --- | --- |
| (N) Normal | As any browser might normally display in any document. |
| (WS) Word-Serial | Centered on streaming line, in large font, one word at a time. |
| (S/ST) Static ST | As a static element above the serial text area until replaced. If the phrase is too long, it is initially serial then truncated and static. |
| (SS) Scrolled Static | As a static element in separate scrolled frame, never replaced. |
| (PB) Paused Branch | As a multi-word string that pauses and to which can be branched. Displayed ST if phrase is too long, but paused and not static. |
| (SB) Static Branch | As a static element that can be selected and to which can be branched. |
| (LT) Loop Through | Grouped by name and looped through until next button is hit. Each element can be toggled on/off as it is displayed. Each displayed ST if a phrase is too long, but paused and not static. |
| (PS) Paused for Selection | Used in forms where a form element (e.g., S/ST/PS) indicates that (S/ST) text is replaced after a pause for selection by the user. |

Using the display modes defined above, the following Table 2 defines the display modes for a particular HTML tag and for different display devices:

TABLE 2

| HTML TAG | PAGER | PALM-TOP | LAP-TOP | HIGHER |
|---|---|---|---|---|
| <title> | S/ST | S/ST | SS | SS |
| <header> | S/ST | S/ST | SS | SS |
| <A HREF=> | PB | PB | SS | SS |
| <image> | img marker with serial alt-text | img marker with serial alt-text | SS | SS |
| <form> | PB | SB | SB | SB |
| text | no edit, paused | normal | normal | normal |
| textarea | no edit, serial | normal | normal | normal |
| radio | LT | normal | normal | normal |
| check | LT | normal | normal | normal |
| button | LT at end | normal | normal | normal |

In one embodiment of the invention, display 60 is a three line LCD display used by a pager. It is worthy to note that the pager display used in this embodiment is representative of the relatively small size displays that this embodiment of the invention can use to deliver large amounts of information for a user to not only read, but successfully navigate or "browse" through (in the case of a document stored on the WWW). It can be appreciated, however, that any size electronic or computer display falls within the scope of the invention, as indicated, for example, in Table 2.

This section will describe in further detail the loading, parsing, formatting and displaying steps used by word-serial reader 40.

This embodiment of word-serial reader 40 assumes that the device where the display is located can establish a bi-directional connection to a network resident proxy. The proxy has access to a user database that stores bookmarks. The bookmarks can be streamed through in order to select one for browsing. Once a bookmark is selected, the proxy issues a redirect to that URL. The proxy can also be used to store new URLs as requested by the user. Part of the browsing software might actually be implemented as a proxy, which would act as a client instead of redirecting to the book-marked URL. This can add more complex preprocessing of HTML document 36, especially for pagers and palm-tops. One example of processing that the proxy can add is some of word-serial reader reformatting diagramed in FIG. 3 (described later).

The proxy can be implemented as a Common Gateway Interface (CGI). CGI is a standard part of the Hypertext Transfer Protocol (HTTP) for spawning a process that runs on the web server and that can take as input all environment variables relevant to HTTP including the "QUERY_STRING". This process executes an application specific task and returns any form of document supported by the HTTP protocol. CGI is typically used to support fill-out forms, conduct transactions or generate HTML documents "on-the-fly."

Figure 3:
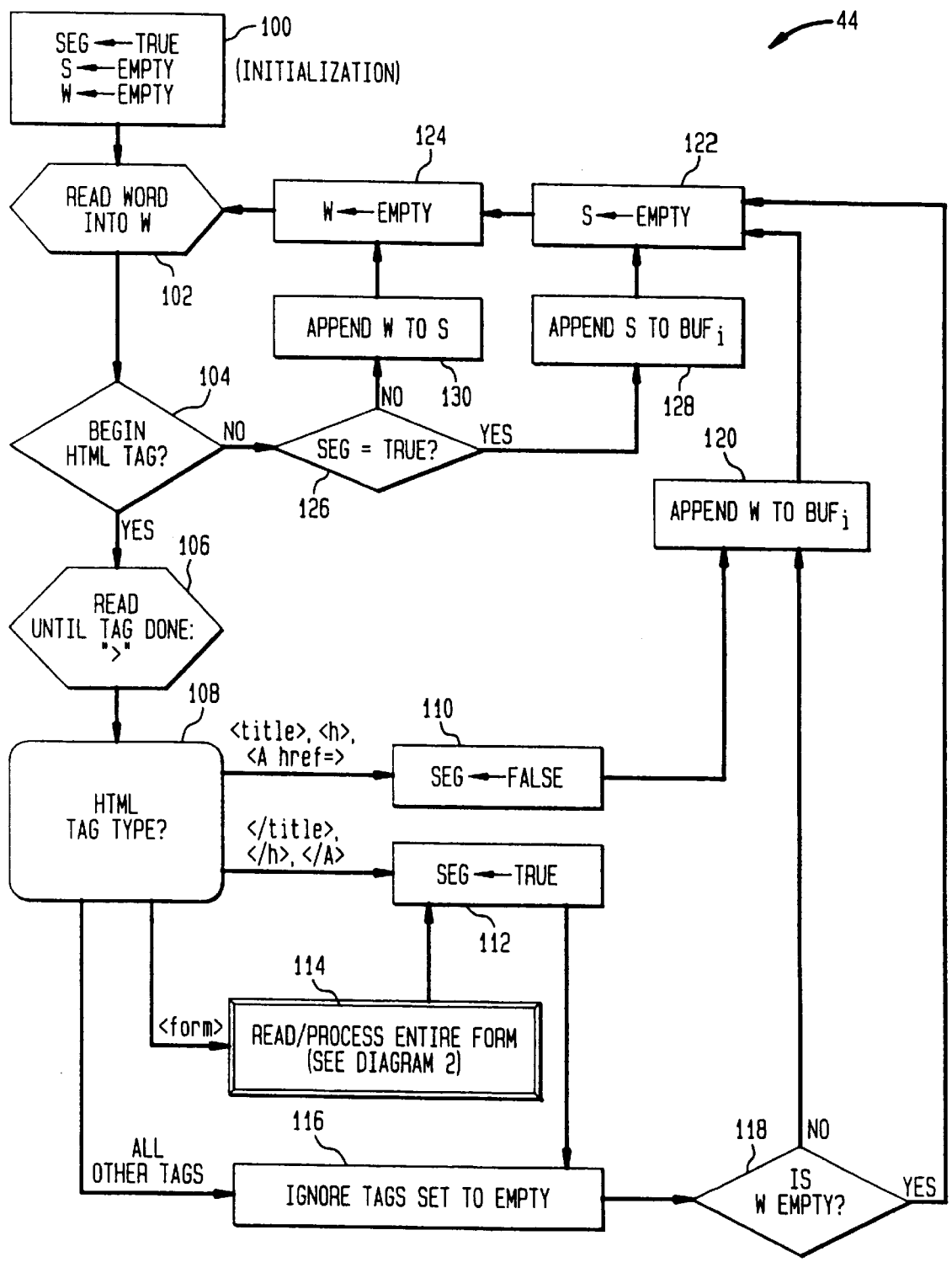
FIG. 3 is a block flow diagram for a docreader module for an HTML document in accordance with one embodiment of the invention.

FIG. 3 is a block flow diagram for a docreader module 44 for an HTML document in accordance with one embodiment of the invention. Docreader 44 converts a document stored in a source format, which for this embodiment is HTML, and converts it to a standard format used for streaming in accordance with one embodiment of the invention. Although HTML is specifically used in this embodiment of the invention, it can be appreciated that any information stored in a "non-standard" format falls within the scope of the invention. For example, information stored in an electronic mail (e-mail) format or text format can be converted to a standard streaming format for use with word-serial reader 40.

As shown in FIG. 3, SEG is initialized to TRUE, and S and W are initialized to EMPTY at step 100. At step 102, a word from HTML document 36 is read into W. At step 104, docreader module 44 checks whether the word is an HTML tag or control code. If it is a tag, the end of the HTML tag is found at step 106.

Step 108 identifies the type of HTML tag, and based upon this determination processes the information following the tag. Thus, if W is <title>, <h>, <A href=>, SEG is assigned FALSE at step 110, appended to BUFi at step 120, S is reset to EMPTY at step 122, W is reset to EMPTY at step 124, and the next word in HTML document 36 is read into W at step 102.

BUFi is a buffer of character strings that dynamically grows as needed. The subscript refers to a particular buffer. Multiple fixed-sized buffers, however, may also be used, with BUF indicating a particular buffer, and the subscript i indicating a string within the buffer. In this case, the subscript i would also need to be incremented after, for example, every block labeled "Append <string> to BUFi."

If at step 108, the HTML tag is </title>, </h> or </A>, SEG is assigned TRUE at step 112, and all ignored tags are set to EMPTY at step 116. At step 118, docreader module 44 checks whether W is EMPTY, and if not, executes steps 120, 122 and 124, and processes the next word at step 102. If W is EMPTY, docreader module executes steps 122 and 124, and processes the next word at step 102. If at step 108 the HTML tag is <form>, the entire form is read and processed at step 114 according to the steps shown in FIG. 4. SEG is then assigned TRUE at step 112, steps 116 and 118 are executed, and depending on whether W is EMPTY, steps 120, 122 and 124 or steps 122 and 124 are executed and the next word is read into W at step 102.

If at step 104, the word is not an HTML tag, then SEG is tested to determine whether SEG equals TRUE at step 126. If yes, S is appended to BUFi at step 128, steps 122 and 124 are executed, and the next word is processed. If no, W is appended to S at step 130, step 124 is executed, and the next word is processed at step 102.

Figure 4:
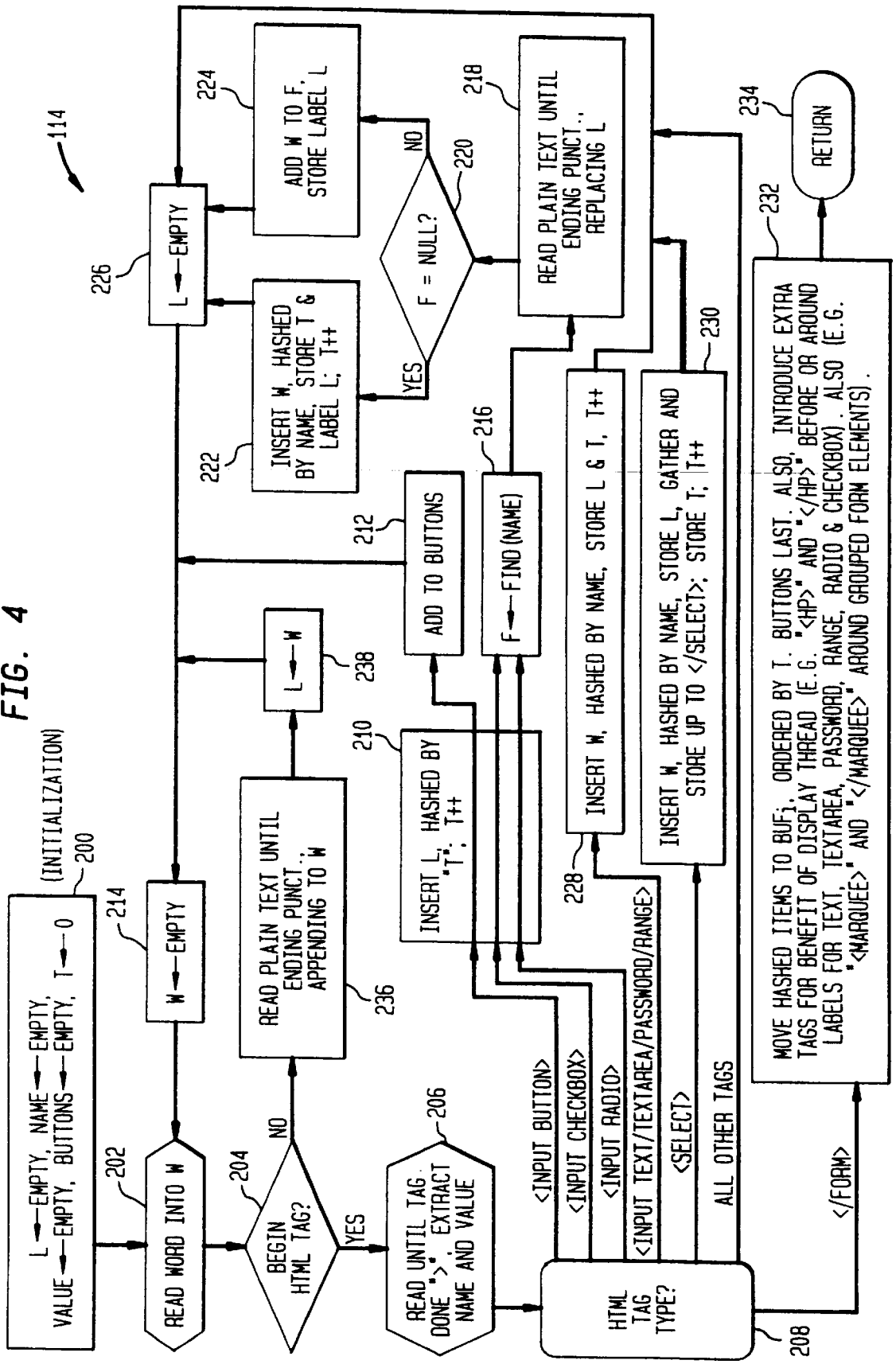
FIG. 4 is a block flow diagram for processing the body of an HTML form for a docreader module in accordance with one embodiment of the invention.

FIG. 4 is a block flow diagram for processing the body of an HTML form for a docreader module in accordance with one embodiment of the invention. FIG. 4 illustrates step 114 referred to in FIG. 3, in further detail. The logic is similar to the block flow diagram shown in FIG. 3, with additional sorting steps to provide a proper serial display and navigation interface. This form processing step 114 assumes some conventions in authoring HTML document 36 and some conventions in how the form elements are displayed. The technique illustrated in FIG. 4 is for a pager, which requires the most processing to make the form usable.

Display 60 will need to stream through sections of the form one at a time, in order to make sense to the user. For example, a set of radio control buttons are related if they have the same name, and will be shown in a circular sequential order even if other controls are encountered between some radio buttons. This requires a sorting of some elements into groups, and a temporal ordering of groups for display and real-time control purposes. Submit buttons are all grouped together and presented at the end of the form in which they are embedded. Labels for radio buttons are assumed to occur directly after each radio button. It would help if the label were always followed by a tag like </INPUT>. Absent this configuration, everything except for a new <INPUT> tag will be ignored, and used as the end of label marker. The same thing is done for check box labels. Unfortunately, check boxes may or may not be named consistently. Therefore, grouping is applied to check boxes, but not looped through for singleton groups in presentation module 48. Singleton check box groups will have to rely on proper authoring of check boxes so that their position in HTML document 36 is consistent with the temporal ordering that makes sense for streaming. Labels for text fields are assumed to be any plain text "sentence" that is encountered before the text field. Short labels are displayed as a multiword phrase, and others are displayed in word-serial fashion.

As shown in FIG. 4, at step 200 L, NAME, VALUE, and BUTTONS are initialized to the value EMPTY, while T is assigned zero (0). At step 202, a word from the body of the form is read into W. W is tested as to whether it is an HTML tag at step 204. If not, the plain text is read until an ending punctuation, and appended to W at step 236. L is assigned W at step 238, and W is assigned EMPTY at step 214. The next word is then read into W at step 202. If at step 204, W is an HTML tag, the end of the tag is located, and the name and value of the tag is extracted at step 206.

The HTML tag type is checked at step 208. If the HTML tag is <input button>, then L is inserted hashed by "T" and T is incremented at step 210. At step 212, buttons are added. Step 214 is then executed and the next word is read into W at step 202.

The term "hash" as used herein refers to a hash-table. When items are inserted into a hash-table, a hashing function is used to translate a string (key) into an index into the table. Inserting a string into the table implies that a data structure is used to store the string and any other necessary data. Thus, at step 210, string L is inserted into the hash-table, using a string representation of T as the key. It is worthy to note that labels are not HTML elements, but chunks that are extracted from the commonly observed structure of forms, thus explaining the use of the counter T as the hash key.

If the HTML tag is <input checkbox> or <input radio>, step 210 is executed and F is assigned FIND(NAME) at step 216. At step 218, the plain text after the tag is read until an ending punctuation is reached, and replaces L. At step 220 F is tested whether it is equal to NULL. If yes, the HTML tag W is inserted into the hash-table using the value of the "name" attribute as the key. T and the label L are stored with it (using the data-structure). At step 226, L is assigned EMPTY, and step 214 is then executed and the next word is read into W at step 202. If at step 220 F is not equal to NULL, the HTML tag W is added to the data-structure referenced by F together with label L at step 224. Steps 226 and 214 are then executed.

If the HTML tag is <input type=text|textarea|password|range>, W is inserted into hash-table using name as the key, L (a label accumulated from the previous chunk of plain text) and T are stored with it, and T is incremented at step 228. Steps 226 and 214 are then executed.

If the HTML tag is <select>, W is inserted into hash-table using "name" as the key, L and T are stored with it, and T is incremented at step 230. Steps 226 and 214 are then executed.

If the HTML tag is any other tag, then steps 226 and 214 are executed directly.

If the HTML tag is </form>, at step 232 hashed items are moved to BUFi, and ordered by T with buttons last in the order. Extra tags are also introduced for the benefit of presentation module 48. For example, "<HP> and "</HP>" are introduced before or around labels for text, textarea, password, range, radio and checkbox. In addition, "<Marquee>" and "</Marquee>" are introduced around grouped form elements. Labels that are directly tied to a form element can be integrated into the tag using a special attribute, e.g., <INPUT . . . LABLE="label text">. At step 234, execution returns.

Figure 5:
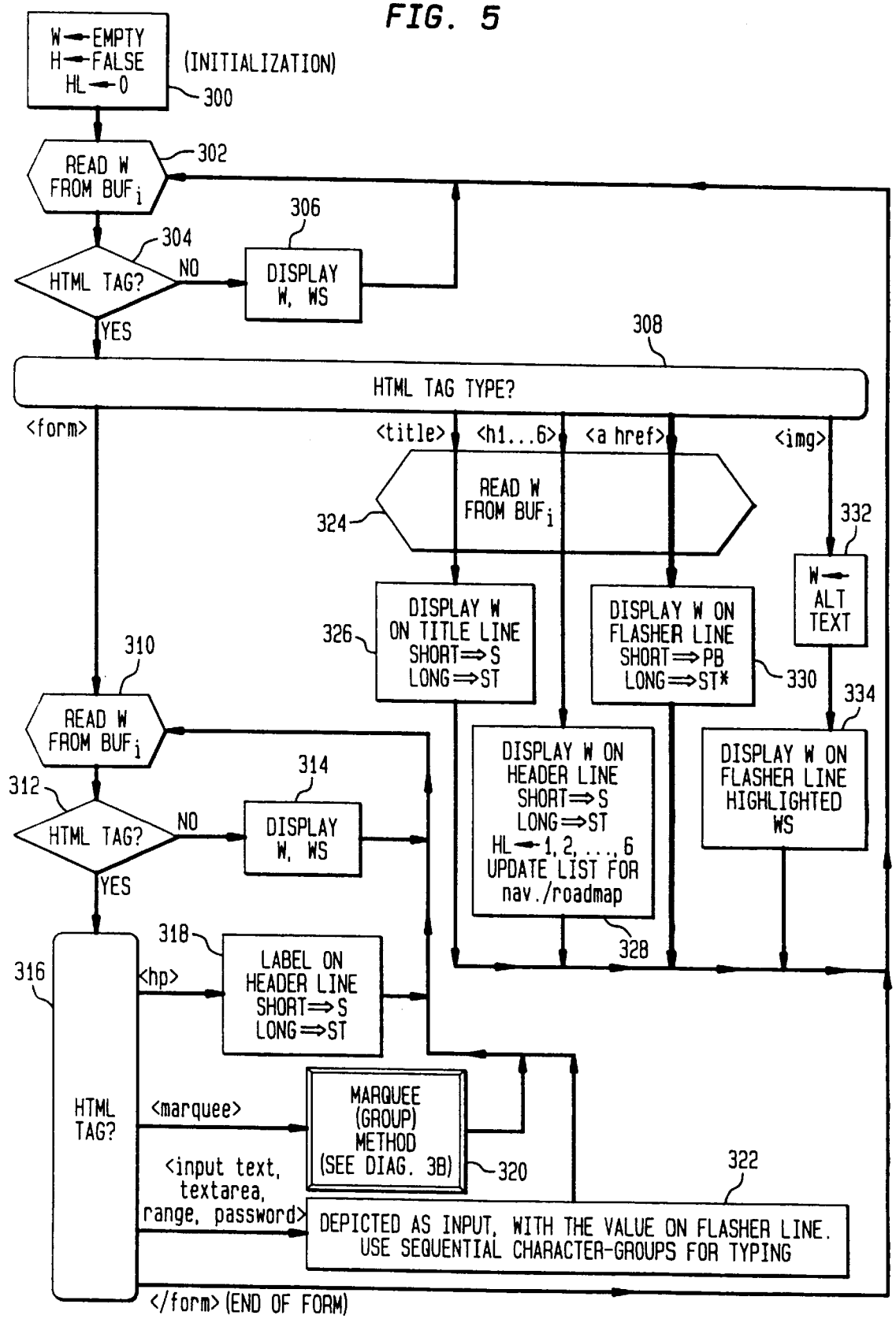
FIG. 5 is a block flow diagram of a presentation module in accordance with one embodiment of the invention.

FIG. 5 is a block flow diagram of a presentation module in accordance with one embodiment of the invention. This diagram shows one possible set of methods for displaying HTML document 36 on a pager or similar low resolution device. On a three line pager, there is a separate title and header line. For lower end pagers, the same line is used for both. The title, however, can be represented as a separate level in the up/down navigation process.

As shown in FIG. 5, W is initialized to EMPTY, H to FALSE, and HL to zero (0) at step 300. At step 302, a word is read into W from BUFi. If W is not an HTML tag at step 304, W is displayed WS at step 306 on display 60, and the next word is read into W at step 302.

If W is an HTML tag at step 304, W is processed according to HTML tag type at step 308. If the HTML tag is <form>, another word is read into W from BUFi at step 310. If W is not an HTML tag at step 312, W is displayed WS, and the next W is read from BUFi at step 310. If W is an HTML tag at step 312, W is processed according to HTML tag type at step 316. If the HTML tag is <hp>, the label is displayed at step 318 on the header line of display 60: if short, display method is S; if long, display method is ST, and step 310 is executed. If the HTML tag is <marquee>, W is processed at step 320 using the Marquee (group) method shown in FIG. 6, and step 310 is executed. If the HTML tag is <input text,textarea,range,password>, W is depicted as input with the VALUE on streaming line and sequential character-groups are used for typing at step 322, and step 310 is executed. If the HTML tag is </form> (end of form), step 302 is executed.

If at step 308, the HTML tag type is <title>, W is read from BUFi at step 324. At step 326 W is displayed on title line: if short display method is S; if long, display method is ST.

If at step 308, the HTML tag type is <h1 . . . 6>, W is read from BUFi at step 324. W is displayed on the header line of display 60 at step 328: if short, the display method is S; if long, the display method is ST. Also at step 328, HL is assigned 1 through 6 as appropriate, and the list for nav./roadmap is updated. Step 302 is then executed.

If at step 308, the HTML tag type is <a href>, W is read from BUFi at step 324. At step 330, W is displayed on the streaming line of display 60: if short, the display method is PB; if long, the display method is ST, but with PB capability. Step 302 is then executed.

If at step 308, the HTML tag type is <img>, W is assigned ALT TEXT at step 332. At step 334, W is displayed on streaming line of display 60 in highlighted WS mode. Step 302 is then executed.

Figure 6:
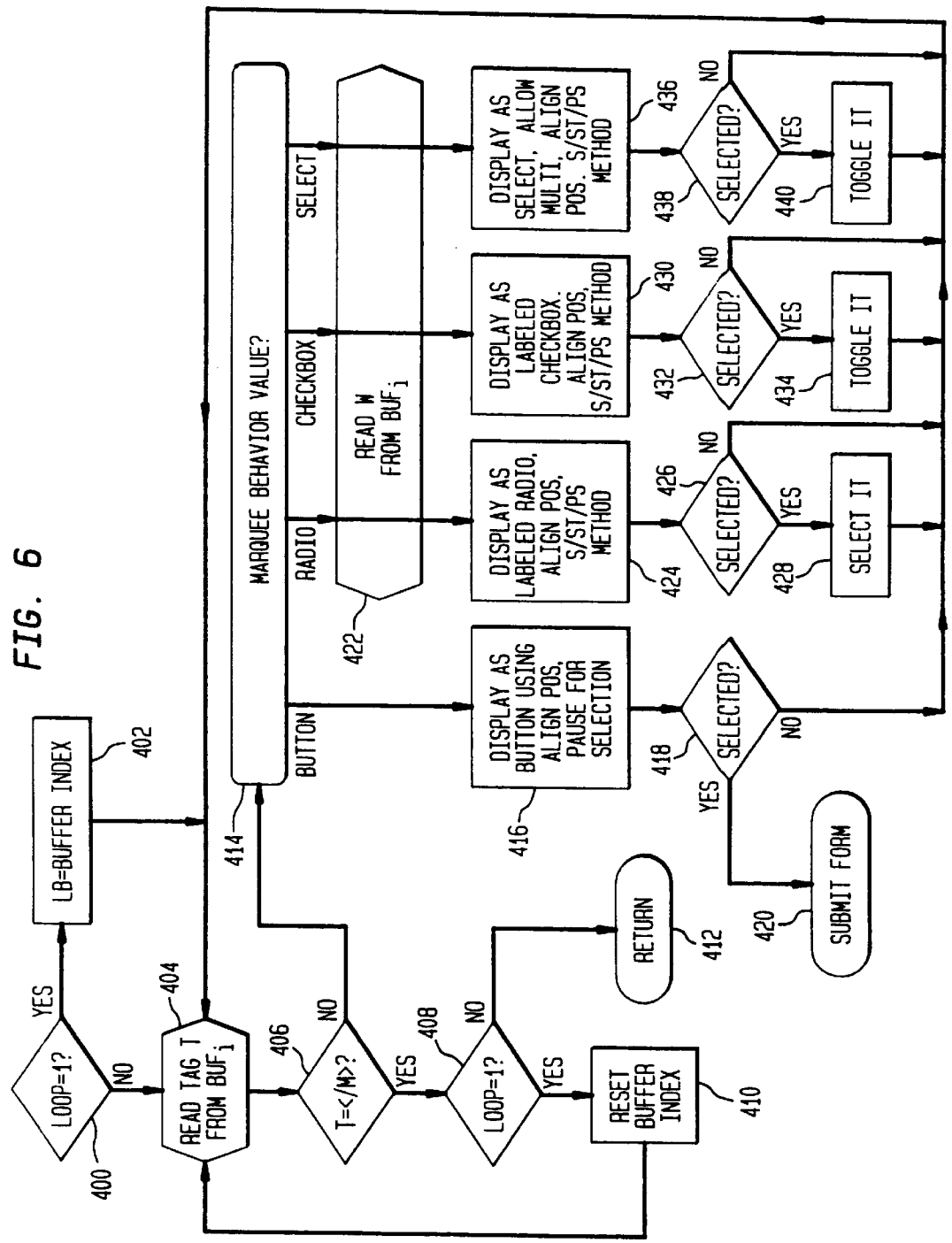
FIG. 6 is a block flow diagram of the Marquee method for grouping elements in accordance with one embodiment of the invention.

FIG. 6 is a block flow diagram of the Marquee method for grouped elements in accordance with one embodiment of the invention. The marquee tag was generated by docreader module 44. The tag includes attribute values specifically tailored for the display methods previously discussed in detail. Some of the original attributes in the MicroSoft (MS) Internet Explorer extensions of HTML were reused, the values are interpreted to suit word-serial reader 40. For example, the following is a specification of how attributes are assigned:

```
<MARQUEE ALIGN=1|2|3
BEHAVIOR=radio|checkbox|button|select LOOP=0/1
SCROLLDELAY=number>
```

The ALIGN value indicates display of the element on the first, second or third lines of the pager display (usually set to 3). The BEHAVIOR value indicates what type of controls are grouped. Each will need appropriate graphical representation, and real-time control logic. The LOOP value indicates if the group is looped through or not. If the group is looped through, the entire group will be redisplayed until the FORWARD button (button 510 shown in FIG. 7) is pressed. The BACKWARD button (button 508 shown in FIG. 7) would move to the previous element or group. For each element i the loop might be streamed if the phrase that labels the control is too long. This implies two levels of simultaneous streaming.

As shown in FIG. 6, if LOOP equals one (1) at step 400, then LB is assigned the current buffer index at step 402, before executing step 404. Tag T is read from BUFi at step 404. If T equals </M> at step 406, then LOOP is tested again at step 408. If LOOP is equal to one (1), the CURRENT BUFFER INDEX is reset to LB at step 410, and the next tag T is read from BUFi at step 404. If not, the Marquee method ends and returns at step 412.

If at step 406 T is not equal to </M>, then T is processed according to the Marquee BEHAVIOR value at step 414. If the Marquee BEHAVIOR value is a button, the button is displayed using ALIGN position, and the program is paused for user selection at step 416. If the button is selected at step 418, the form is submitted at step 420. If not, step 404 is executed.

If the Marquee BEHAVIOR value is a radio, then W is read from BUFi at step 422. At step 424, the labeled radio is displayed using ALIGN position and the S/ST/PS display method. If the radio is selected at step 426, then this is indicated at step 428, and step 404 is executed. If not, step 404 is executed directly.

If the Marquee BEHAVIOR value is a checkbox, then W is read from BUFi at step 422. The labeled checkbox is displayed using ALIGN position and the S/ST/PS display method at step 430. If selected at step 432, the checkbox is toggled at step 434, and step 404 is executed. If not, step 404 is executed directly.

If the Marquee BEHAVIOR value is a select, then W is read from BUFi at step 422. The select is displayed using multiple ALIGN positions and the S/ST/PS display method at step 436. If selected at step 438, the select is toggled at step 440, and step 404 is executed. If not, step 404 is executed directly.

Figure 7:
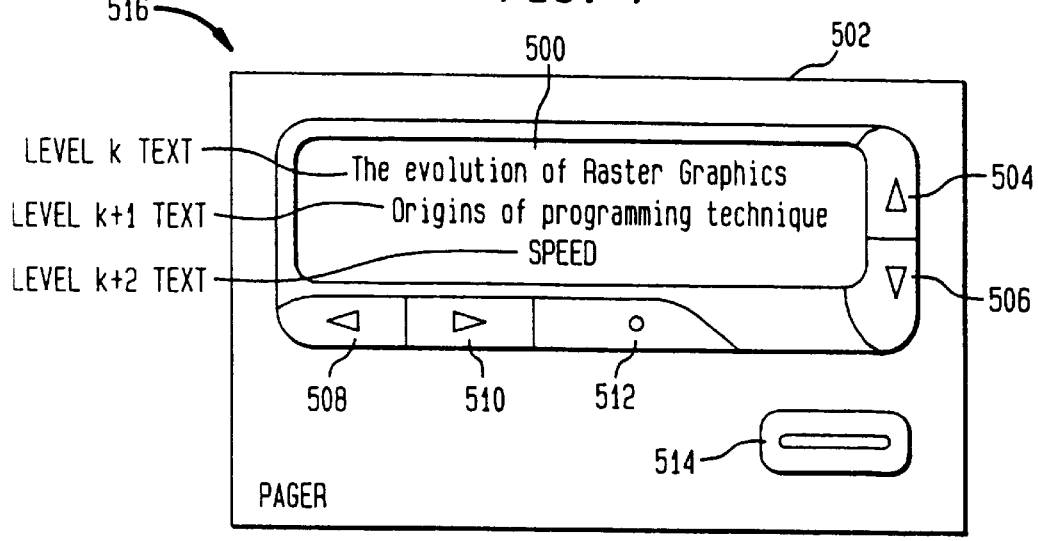
FIG. 7 illustrates a pager used in accordance with one embodiment of the invention.

FIG. 7 illustrates a pager used in accordance with one embodiment of the invention. A pager 516 is assumed to be a five button pager, with a sixth button for power, and a display 500 surrounded by a casing 502. Display 500 is assumed to be a three line display, with enough resolution for simultaneous display of two lines of small text symbols (identified as level k text and level k+1 text), and one line of larger text symbols (identified as level k+2 text).

In this embodiment, these five buttons comprise user interface 56 for word-serial reader 40. Buttons 504 and 506 are used to navigate up and down through the various levels of information for HTML document 36, respectively. Buttons 508 and 510 are used to move backward and forward through HTML document 36 while in manual mode, respectively. Button 512 pauses the streaming mode. Power for the pager is controlled by button 514.

While in streaming mode, buttons 508 and 510 are used to control the streaming speed, i.e., move slower and faster, respectively. This would be true for all cases except when looping through a form, where even while flashing, the button should navigate to the next element or group of elements. In all other cases, forward and backward navigation would only operate when in paused-stream mode, i.e., after pressing the pause button. Pressing pause again would resume word flashing, and would revert back to slower/faster interpretation for buttons 508 and 510.

Alternatively, buttons 508 and 510 could be designed to register double-presses. In this case, a single press of buttons 508 and 510 would be slower and faster, respectively, and a double press would be nav-backward and nav-forward, respectively. With this alternative, the meaning could remain consistent, even in the form element looping method of display. Double-pressing capability might also improve the typing input technique discussed later.

Figure 8A:
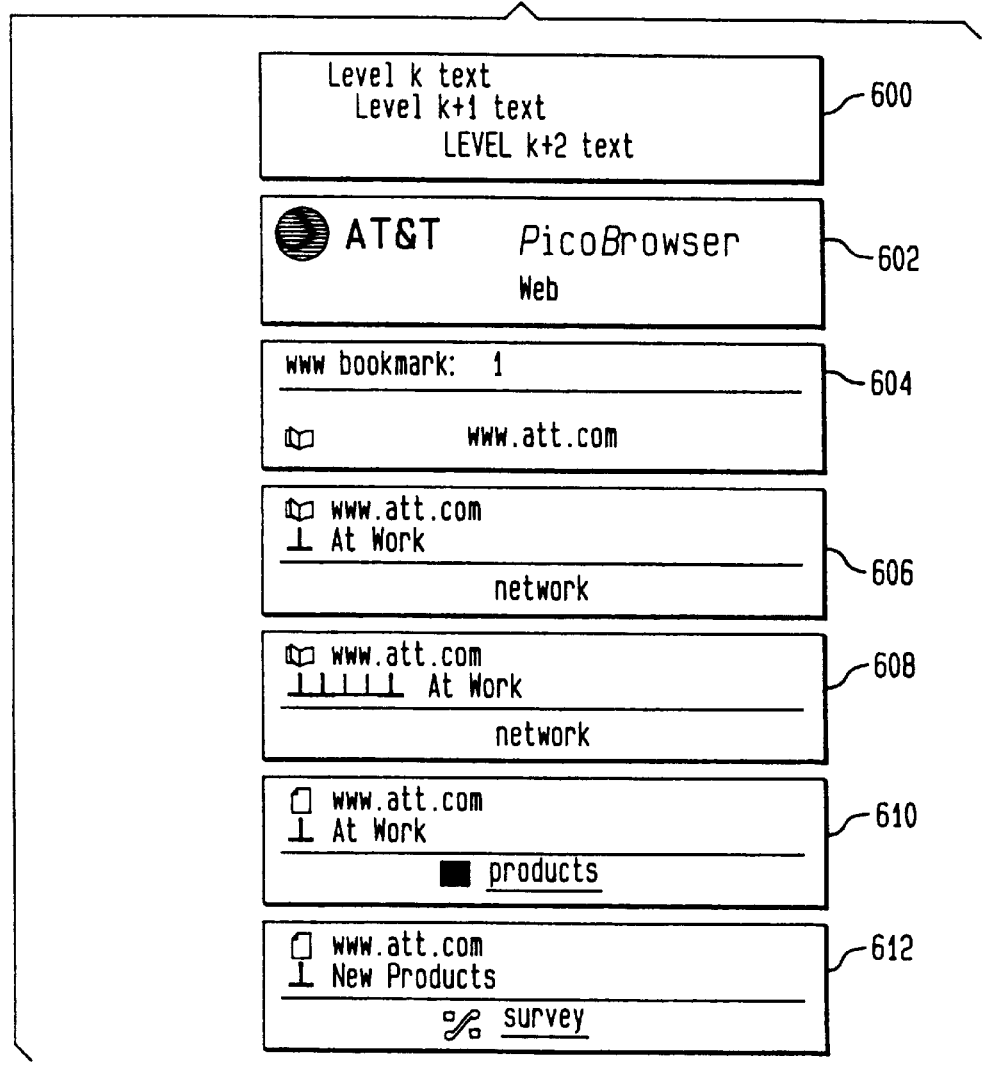
FIG. 8(A) is an illustration of how HTML information is presented on a pager display in accordance with one embodiment of the invention.
Figure 8B:
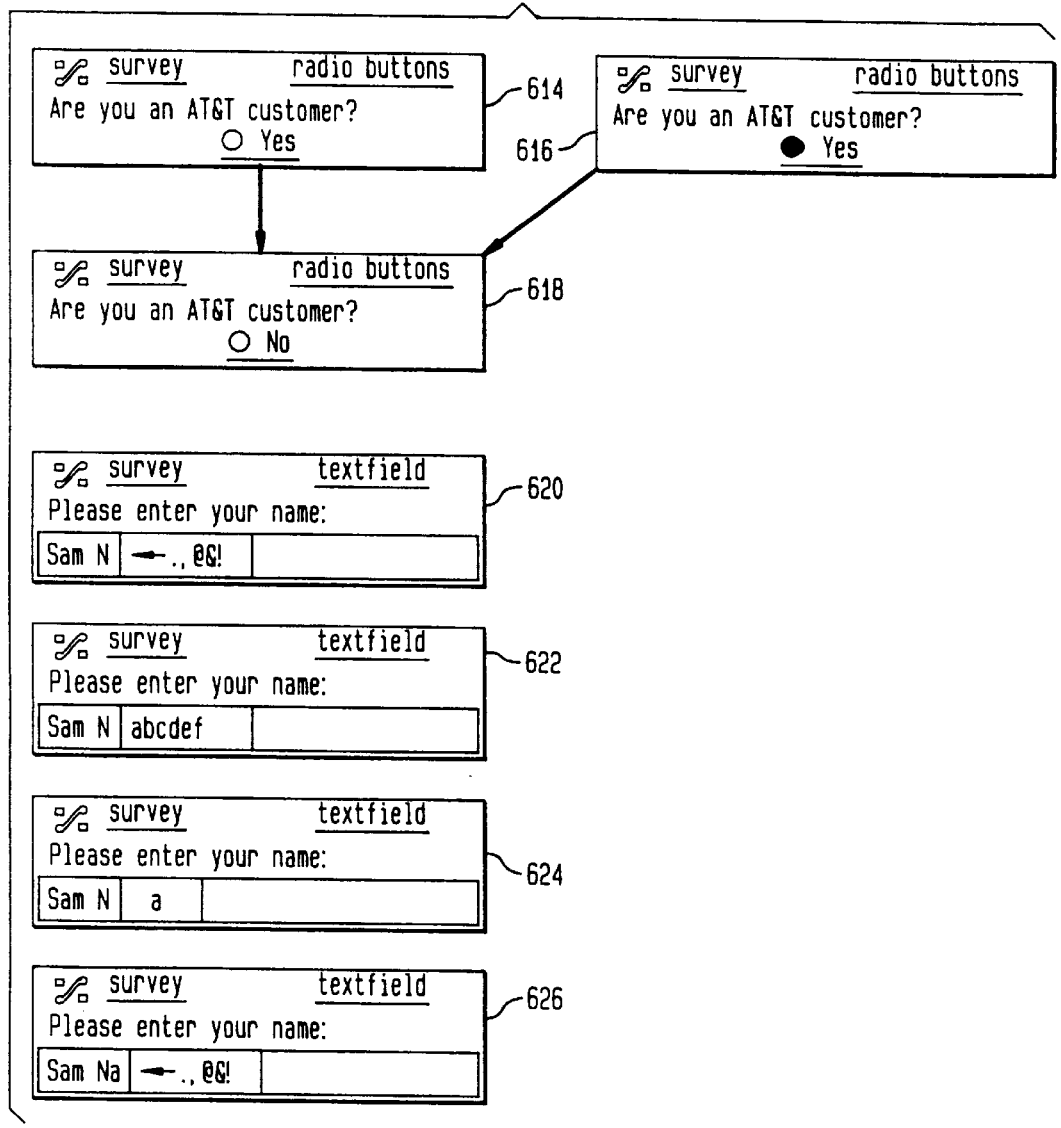
FIG. 8(B) is a first illustration of how HTML form information is presented on a pager display in accordance with one embodiment of the invention.

Display 500 includes up to three levels at a time in three different text lines. The top two are rendered with smaller text symbols. The bottom line/level is rendered with larger text symbols. The bottom line is also the "current" level, and typically this line is used for streaming. For some levels the stream will include just a single word and advance faster, while others—checkboxes, radio buttons, and so forth—will display an entire line of text and will advance more slowly. FIGS. 8(A), 8(B) and 8(C) discussed below represent only a few of the many techniques that could be used for supporting the streamed and paused-streamed HTML document 36.

FIG. 8(A) is an illustration of how HTML information is presented on a pager display in accordance with one embodiment of the invention. In this embodiment of the invention, word-serial reader 40 presents information on a pager display in a layered format. In this particular embodiment, six levels are used.

Frame 600 shows the general format of how word-serial reader 40 presents information on a pager display. In general, level k text is displayed on the first line of display 500, and level k+1 text on the second line of display 500. Although streaming can occur on any level, level k+2 of display 500 is the default level which is normally used for streaming.

Frame 602 shows an example of a first level presented on display 500. A user could select which task the pager is used to accomplish. In this case, the task selected is to "browse" the WWW.

Frame 604 shows an example of a second level presented on display 500. A user could select a bookmark that is streamed on level k+2 of display 500. In this example, the bookmark for "www.att.com" is selected. In addition, the number of the bookmark shown on level k of display 500 could be streamed as well. It is worthy to note that level k+1 is not used in this example, but could be used to display the last bookmark visited.

Frame 606 shows a first example of a third level presented on display 500. At this level, HTML document 36 is streamed for reading by the user. The URL or document title could appear on level k (in this example the URL is displayed), and the bookmark symbol on the top left-hand corner of display 500 is a page icon if it is a new URL.

Frame 608 shows a second example of a third level presented on display 500. In this example, level k+1 displays previous headers when the manual or paused-stream mode is active. In this mode, the "forward" and "back" buttons (buttons 508 and 510 shown in FIG. 7) could apply to words or to heading demarcated sections.

Frame 610 shows a third example of a third level presented on display 500. In this example, a user is browsing the same URL, and encounters an image or hyperlink tag. For images, the alt-text information would be displayed for the user.

Frame 612 shows a fourth example of a third level presented on display 500. In this example, a user is browsing the same URL, and encounters a form. It is worthy to note that if the form has a "name" it is displayed PB, or slowly streamed ST. Otherwise the word FORM is used. In this example, the form is named "survey," and is displayed on level k+2.

FIG. 8(B) is a first illustration of how HTML form information is presented on a pager display in accordance with one embodiment of the invention. FIG. 8(B) shows several examples of a fourth level presented on display 500.

Frame 614 shows a first example of a fourth level presented on display 500. The selected form "survey" is displayed with labels on the header line (level k). The first element encountered is a group of radio buttons that use the marquee HTML tag. Not shown in frame 614 is the possible WS display of the label on the streaming-line before placing it on the header line, if the label is too long to view all at once. This is true of all text classified as a label by the parser, for all level 4 examples that follow. It is also done for all text not classified as a label within a form. Frame 614 shows the response button as unselected, while frame 616 shows it as selected.

Frame 618 shows a second example of a fourth level presented on display 500. After a reasonable length of time, the next button is flashed on level k+2 of display 500 to await a response. An unselected radio button is selected by pressing the "down" button (button 506 shown in FIG. 7). The group is continuously looped through until the user presses the "forward" button (button 510 shown in FIG. 7).

Frame 620 shows a third example of a fourth level presented on display 500. The next group of elements are assumed to contain a type-in text field. Typing can be allowed through the use of streaming and the "down" button (button 506 shown in FIG. 7). By grouping letters of the alphabet together, two button presses are required to select the group, then one to select the letter. Overall, this speeds up the typing process. A backspace character, however, must be included. Upper case letters are selected using the "up" arrow button (button 504 shown in FIG. 7) to type the final character. Otherwise, typing would be case insensitive. As shown in frame 620, the user did not select the first letter group, so the next letter group is displayed.

Frame 622 shows a fourth example of a fourth level presented on display 500. In frame 622, the user selected the displayed group and reads the streaming of letters within that group.

Frames 624 and 626 show a fifth example of a fourth level presented on display 500. When the desired letter appears, the "down" button (button 506 shown in FIG. 7) selects the lower-case, the "up" button (button 504 shown in FIG. 7) selects the upper-case. Typing continues in the next position starting with the first letter group, until the "forward" arrow button is pressed. The letter groups might be:

| |←.,@&!| |abcdef| |ghijk| |lmnop| |
|---|---|---|---|
| |qrstu| |vwxyz| |01234| |56789|. |

This would require only eight groups of 42 characters. Instead of streaming sequentially through all 42 selections in the worst case, the display streams through at most 8, than 6, for a total of 14 time segments in the worst case. Other groupings might be possible. There are also type-ins that designate that the value is a number. This might restrict the groups to only three, for example:

| |←.,-| | |01234| | |56789|. |
|---|---|---|

Password fields would print all typed characters using "#". When the user is finished typing, the "forward" button (button 510 shown in FIG. 7) moves to the next form element or group of elements. If the user comes back to this element, using the "back" button (button 508 shown in FIG. 7), the typing will resume at the end of the current set of characters.

FIG. 8(C) is a second illustration of how HTML form information is presented on a pager display in accordance with one embodiment of the invention.

Frame 628 shows a sixth example of a fourth level presented on display 500. Frame 628 shows an example of the same survey form where the next element is a selection menu. Frame 628 shows a selection element if it is not selected.

Frame 630 shows a seventh example of a fourth level presented on display 500. Frame 630 shows a selection element if selected. The icon at the left of level k+2 can be designed to indicate where in the menu the user is currently reading. This would be especially helpful to the user when the selection menu is back at the beginning again. When a multiple selection menu is presented, the same symbol could help indicate both where the user is currently reading, and where else in the menu the user has selected a menu item. The "forward" button (button 510 shown in FIG. 7) advances to the next element or group. The user could also choose to not select a menu item. If the user goes back to the menu using the "back" button (button 508 shown in FIG. 7), the menu sequencing begins again at the beginning, or at the first previously selected item in the menu.

Frames 632, 634 and 636 are an eighth example of a fourth level presented on display 500. Frames 632, 634 and 636 show the same survey form where the next element is a group of checkboxes. An unselected checkbox is selected by pressing the "down" button (button 506 shown in FIG. 7). The group is continuously looped through until the user presses the "forward" button (button 510 shown in FIG. 7). Frame 632 shows an unselected checkboxes, and frames 634 and 636 show selected checkboxes.

Frames 638, 640 and 642 are a ninth example of a fourth level presented on display 500. Frames 638, 640 and 642 show the same survey form where the last element is a group of submit buttons. A submit button is selected by pressing the "down" button (button 506 shown in FIG. 7). Selecting a submit button also submits the form and replaces the current URL. The group is continuously looped through until the user presses the "forward" button (button 510 shown in FIG. 7).

Figure 9:
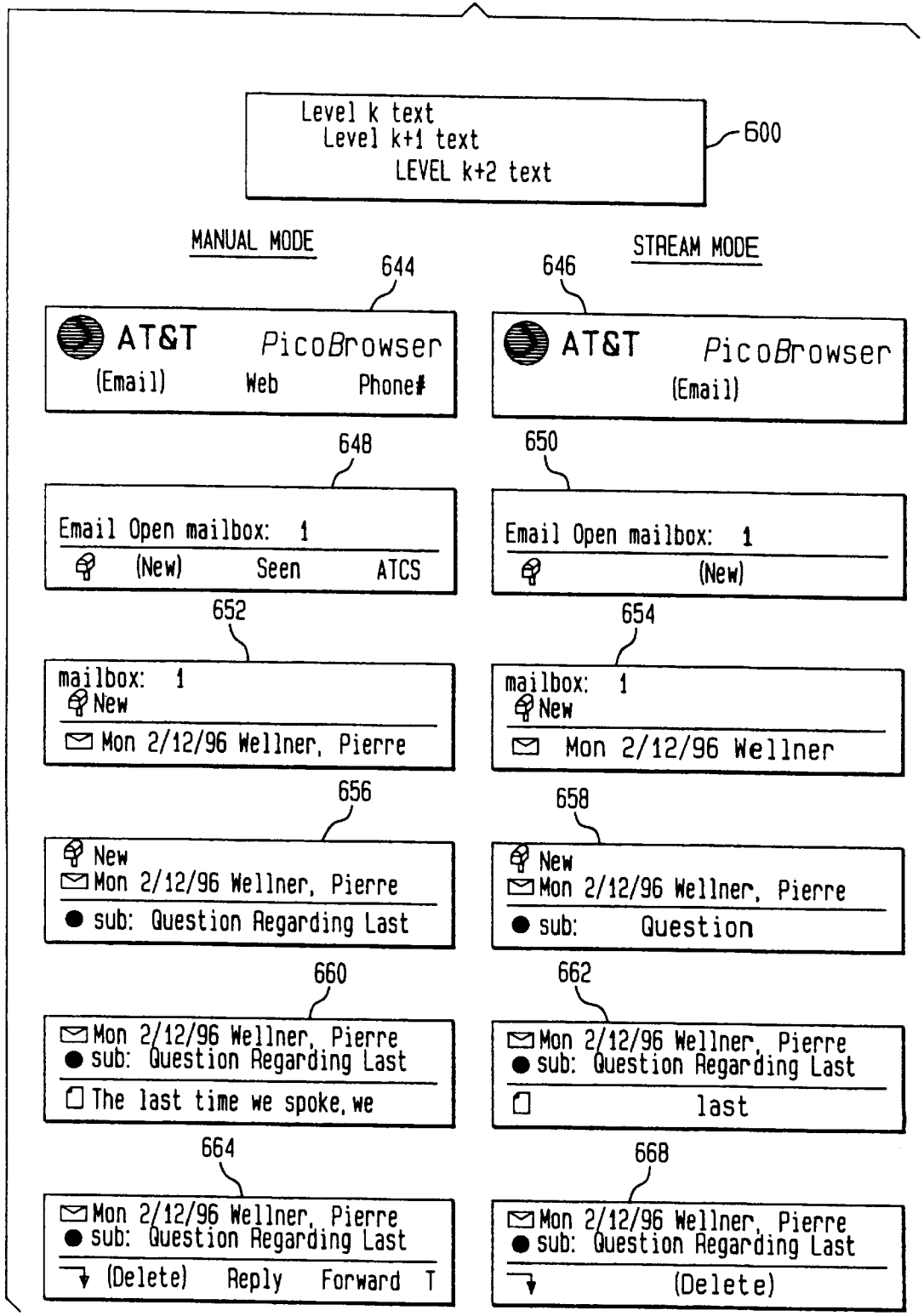
FIG. 9 is an illustration of how electronic mail information is presented on a pager display in accordance with one embodiment of the invention.

FIG. 9 is an illustration of how electronic mail information is presented on a pager display in accordance with one embodiment of the invention. In this embodiment of the invention, word-serial reader 40 presents information on a pager display in a layered format. In this particular embodiment, seven levels are used.

In this embodiment of the invention, it is assumed that the paging device described in FIG. 7 can establish a bi-directional connection to a network resident database. The database stores mail messages as well as information that structures the messages into mail boxes. It also contains information that the user might need to send e-mail, i.e., e-mail address lists and aliases for groups. This database can exist in a standard format, and would be parsed as needed by docreader module 44. This section focuses on how the display and real-time control operates.

This embodiment also assumes that the button controls for the paging device described in FIG. 7 are the same as for the embodiment discussed with reference to FIGS. 8(A), 8(B) and 8(C), with one exception. Instead of button 512 shown in FIG. 7 being used to toggle between paused and streaming mode, button 512 would be used to toggle between a manual mode and streaming mode. Alternatively, manual mode could be replaced by a paused-stream mode in both HTML and e-mail readers. Paused-stream mode is a word-serial mode that turns off the automatic pacing, allows manual pacing, and could change the interpretation of the buttons 508 and 510 depending on the specific display technique being used. Manual mode would only be relied upon for multiple words if manual pacing is more appropriate when paused.

As with FIG. 8(A), frame 600 shows the general format of how word-serial reader 40 presents information on a pager display. In general, level k text is displayed on the first line of display 500, and level k+1 text on the second line of display 500. Although streaming can occur on any level, level k+2 of display 500 is the default level which is normally used for streaming.

Frames 646, 650, 654, 658, 662 and 668 show how e-mail levels 1 through 6 are presented on display 500, respectively, in streaming mode. Frame 646 shows which task is selected at level 1, which is e-mail. Frame 650 shows the level 2 selection of a mail box named "New". It is worthy to note that the message number can be streamed along with the mail box selections. Frame 654 shows the level 3 selection of a message for "Wellner". Frame 658 shows the level 4 message header for the Wellner message. Frame 662 shows the level 5 message body streaming at level k+2 of display 500. Both the words from the body of HTML document 36 are streamed, as well as the header items, e.g., subject, to, from, attention, date, and so forth, on level k+2 of display 500. Frame 668 shows the level 6 message command for taking some action with the Wellner message, such as delete, reply, forward, transfer, and so forth.

Frames 644, 648, 652, 656, 660 and 664 show how e-mail levels 1 through 6 are presented on display 500, respectively, in manual mode. Each frame displays the same information presented during streaming mode, but allows the user to view the information from HTML document 36 in the conventional page format. It is worthy to note that the text at level k+2 of display 500 does not need large text as with the streaming mode, and that icons can be used to distinguish between attachments and plain headers, as shown in frame 660.

A seventh e-mail level could be implemented in this embodiment as well. Level 7 would depend on the message command chosen, and may jump (temporarily) to any other layer above. For example, "Transfer" would temporarily jump to level 2. "Forward" would temporarily jump to the phone number task, and "reply" would jump to a composition tool.

Navigational short cuts can be introduced between some levels where it makes sense. Typically the most frequently visited mail box is the one that stores new messages. When the user selects the e-mail option, level 2, "select-mail-box" can be skipped, and the "new" mail box automatically opened. In addition, when a message is selected, level 4, "message header" can be skipped since the user will not need to navigate through the header as often as the message body. The user can always select the skipped level by pushing the "up" button (button 504 shown in FIG. 7). In addition, the first message option in the "new" mail box might be the last message sent. The user could then read a message that just arrived, by: (1) turning on the paging device; (2) selecting e-mail; and (3) select the first message displayed. At this point the message date, sender, beginning of subject, and beginning of the message body is on the screen.

This embodiment assumes 3 lines of display, and higher capabilities can be supported for larger display areas. Many pagers, however, exist that have fewer buttons, and smaller displays. Smaller displays are easier to deal with then fewer buttons. The minimal display could be considered to be one line of small text symbols only, although at least two lines would be a better configuration. With two lines of display area, however, only two levels could be displayed at a time. Without larger text for streaming, an icon might be needed to indicate when the stream mode is on.

Figure 10:
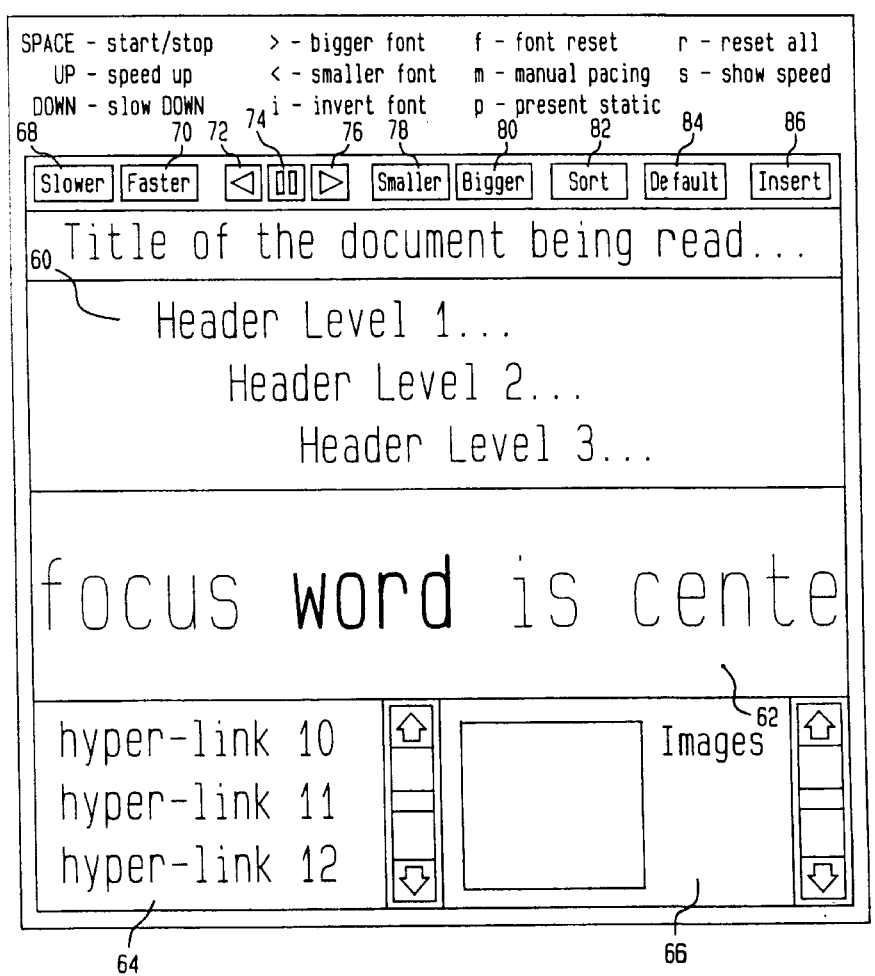
FIG. 10 is a first illustration of how information is presented on a computer display in accordance with one embodiment of the invention.

FIG. 10 is a first illustration of how information is presented on a computer display in accordance with one embodiment of the invention. In this embodiment of the invention, it is assumed that the display is the size typically found in a notebook or laptop computer and higher.

As shown in FIG. 10, word-serial reader 40 displays information in essentially four sections of the display area. Section 60 displays static elements of HTML document 36. These static elements provide the user contextual information and help the user navigate through HTML document 36. For example, section 60 contains a title of the document being read, followed by header level 1, 2 and 3. The number of header levels would be limited by the display area. If HTML document 36 would have more sub-section headers than the display area is capable of displaying at one time, section 60 would continue to display those headers closest in relation to the content being flashed in section 62. Section 62 demonstrates the positioning of the words flashed by presentation module 48. In this example, the word being flashed is the word "word," which is centered in section 62. Alternatively, the flashing words could be positioned on the left or right of section 62, according to user preference.

A multimedia module 62 of presentation module 48 (shown in FIG. 2) handles multimedia items for presentation on the display, such as images, sounds, animations, hypertext links, and so forth. Section 64 indicates where hypertext links are presented for selection by a user. Section 66 indicates where images and animations are presented for a user to view or manipulate.

Also shown in FIG. 10 are the controls available for user interface 56. Button 68 slows down the speed at which words are flashed in section 62, while button 70 increases the speed. Button 72 permits the user to move forward through HTML document 36, button 76 to move backwards, and button 74 to pause the word flashing. Buttons 78 and 80 control font size, while button 82 controls the actual font selection. Button 84 resets all control parameters to their default settings, and button 86 inverts colors on the screen. Although specific control features are illustrated in FIG. 10, it can be appreciated by a person of ordinary skill in the art that any number of additional features or control means for manipulating and/or navigating through HTML document 36 fall within the scope of the invention.

Figure 11:
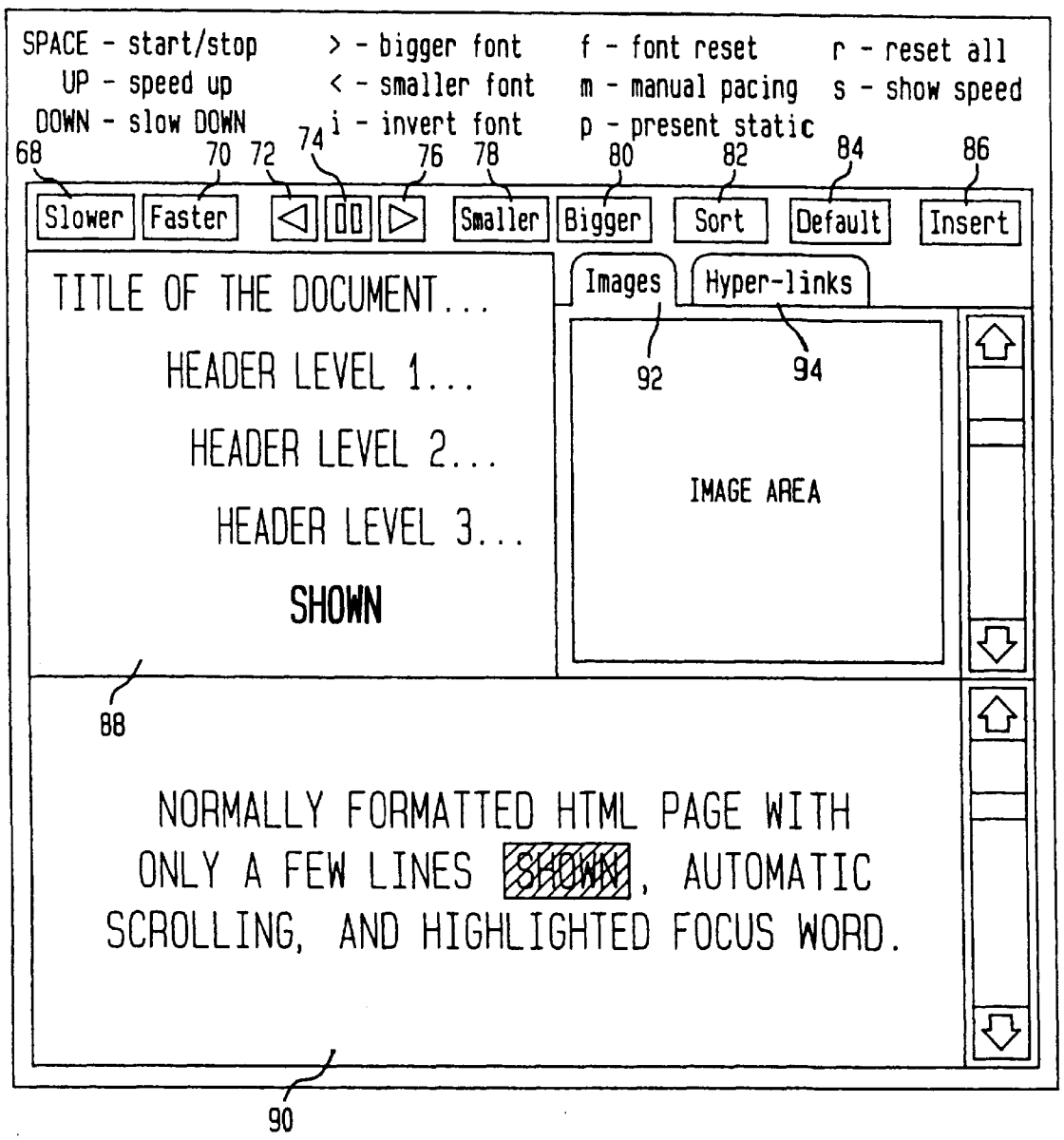
FIG. 11 is a second illustration of how information is presented on a computer display in accordance with one embodiment of the invention.

FIG. 11 is a second illustration of how information is presented on a computer display in accordance with one embodiment of the invention. As shown in FIG. 11, buttons 68, 70, 72, 74, 76, 78, 80, 82, 84 and 86 perform the same functions as discussed with reference to FIG. 10. Section 88 combines the presentation of static elements and flashing words, but otherwise performs the same functions as discussed with respect to sections 60 and 62 shown in FIG. 10. Section 90 adds the feature of displaying several lines of text which provide a number of words surrounding the flashing word "shown" in section 88, thereby providing additional contextual information to a user. To save screen space, section 88 might remain hidden until word flashing is paused, then hidden once again after flashing is resumed. Sections 92 and 94 are used to present images and hypertext links embedded in HTML document 36.

Although a preferred embodiment is specifically illustrated and described herein, it will be appreciated that modifications and variations of the present invention are covered by the above teachings and within the purview of the appended claims without departing from the spirit and intended scope of the invention. For example, although FIGS. 10 and 11 present two formats for organizing the presentation of multimedia information using static elements and sequentially flashing words, it can be appreciated that various combinations can be designed which fall within the scope of the invention.

What is claimed is:

1. A word-serial reader for presenting information on an electronic display, comprising:

a docreader module to receive the information and convert the information from a source format to a serial stream format;

a presentation module to receive said converted information and to sequentially flash said converted information on the display while presenting static textual information to help a user navigate through the information; and wherein said source format is HTML.

2. A word-serial reader for presenting information on an electronic display, comprising a docreader module to receive the information and convert the information from a source format to a serial stream format;

a presentation module to receive said converted information and to sequentially flash said converted information on the display while presenting static textual information to help a user navigate through the information; and wherein said docreader module converts the information by parsing the information into control codes, static elements, multimedia elements and content to be flashed.

3. A word-serial reader for presenting information on an electronic display, comprising a docreader module to receive the information and convert the information from a source format to a serial stream format;

a presentation module to receive said converted information and to sequentially flash said converted information on the display while presenting static textual information to help a user navigate through the information; and wherein said docreader module converts a portion of the information by grouping elements of the information as a marquee.

4. A method for presenting information using an electronic display comprising the steps of:

retrieving the information stored in a source format from a source device;

converting the information from said source format to a uniform serial stream format;

presenting said converted information on the display by sequentially flashing words on the display while presenting static words to hell a user navigate through the information; and wherein said source format is HTML.

5. A method for presenting information using an electronic display, comprising the steps of:

retrieving the information stored in a source format from a source device;

converting the information from said source format to a uniform serial stream format;

presenting said converted information on the display by sequentially flashing words on the display while presenting static words to help a user navigate through the information; and wherein the information is converted by parsing the information into control codes, static elements, multimedia elements and content to be flashed.

6. A method for presenting information using an electronic display comprising the steps of:

retrieving the information stored in a source format from a source device;

converting the information from said source format to a uniform serial stream format;

presenting said converted information on the display by sequentially flashing words on the display while presenting static words to help a user navigate through the information; and wherein a portion of the information is converted by grouping elements of the information as a marquee.

* * * * *

UNITED STATES PATENT AND TRADEMARK OFFICE
CERTIFICATE OF CORRECTION

PATENT NO.     : 6,098,085
DATED          : August 1, 2000
INVENTOR(S)    : Blonder et al.

It is certified that error appears in the above-identified patent and that said Letters Patent is hereby corrected as shown below:

<u>Column 18,</u>
Line 20, delete "hell" and replace with -- help --.

Signed and Sealed this

Eighteenth Day of June, 2002

*Attest:*

*Attesting Officer*

JAMES E. ROGAN
*Director of the United States Patent and Trademark Office*